United States Patent

Richeson, Jr. et al.

[15] 3,700,810

[45] Oct. 24, 1972

[54] FACSIMILE REVERSE SIGNALING SYSTEM

[72] Inventors: William E. Richeson, Jr.; Joel K. Roach, both of Fort Wayne, Ind.

[73] Assignee: The Magnavox Company, Fort Wayne, Ind.

[22] Filed: March 26, 1970

[21] Appl. No.: 22,930

[52] U.S. Cl. ....................179/4

[51] Int. Cl. ....................H04m 11/06

[58] Field of Search........178/2 F, 2 A, 2 B, 2 C, 2 D, 178/2 E, 2 R; 179/1 C, 2 C, 2 DP, 1 CN, 4, 170.2, 1 FS

[56] References Cited

UNITED STATES PATENTS

| | | | |
|---|---|---|---|
| 3,441,665 | 4/1969 | Wuensch | 179/4 |
| 3,069,501 | 12/1962 | Gilman et al. | 179/170.2 |
| 3,432,613 | 3/1969 | Saeger et al. | 179/4 |
| 3,536,840 | 10/1970 | Sullivan | 179/2 DP |

*Primary Examiner*—Kathleen H. Claffy
*Assistant Examiner*—Horst F. Brauner
*Attorney*—Richard T. Seeger

[57] ABSTRACT

A facsimile transmission system utilizing telephone lines for its communication link is disclosed which is adapted to provide signals from the receiving unit to the transmitting unit to indicate failures of transmission to the transmitter. Provision is also made to simultaneously disable the echo suppressors present in long communication links so that two way communication is possible and to indicate to the transmitter that the receiver is ready to begin operation.

8 Claims, 9 Drawing Figures

INVENTORS
WILLIAM E. RICHESON
JOEL K. ROACH
by JEFFERS & YOUNG
Attorneys

INVENTORS
WILLIAM E. RICHESON
JOEL K. ROACH
by JEFFERS & YOUNG
Attorneys

INVENTORS
WILLIAM E. RICHESON
JOEL K. ROACH
by JEFFERS & YOUNG
Attorneys

INVENTORS
WILLIAM E. RICHESON
JOEL K. ROACH
by JEFFERS & YOUNG
Attorneys

INVENTORS
WILLIAM E. RICHESON
JOEL K. ROACH
by JEFFERS & YOUNG
Attorneys

INVENTORS
WILLIAM E. RICHESON
JOEL K. ROACH
by JEFFERS & YOUNG
Attorneys

INVENTORS
WILLIAM E. RICHESO
JOEL K. ROACH
by JEFFERS & YOUNG
Attorneys

FACSIMILE REVERSE SIGNALING SYSTEM

CROSS REFERENCE TO RELATED APPLICATIONS

The present invention relates to a reverse signaling scheme which would find particular utility in a facsimile transmission system, for example, of the type disclosed in U.S. Pat. application Ser. No. 669,315, filed Sept. 20, 1967 in the names of Glenn A. Reese and Paul J. Crane, and entitled "FACSIMILE SYSTEMS" as well as in improvements thereon especially as represented by U.S. Pat. application Ser. No. 803,612, filed Mar. 3, 1969 in the names of William E. Richeson and Robert H. Dreisbach and entitled "IMPROVED FACSIMILE SYSTEM", and U.S. Pat. application Ser. No. 22,937, filed Mar. 26, 1970 in the names of William E. Richeson and Joel K. Roach and entitled "IMPROVEMENTS IN SELECTIVELY ENERGIZING FACSIMILE RECIEVERS".

BACKGROUND OF THE INVENTION

This invention relates to a facsimile transmission system and especially to such a system having a reverse signaling provision whereby the receiver may keep the transmitter informed as to the efficacy of the transmission link. Prior art facsimile transmission systems have relied on a unidirectional transmission link and thus, for example, if the receiver were to lose synchronization or otherwise fail to receive copy and shut down, the transmitter would continue to transmit the information to the end of the document thus resulting in a substantial waste of long distance telephone time. Carrier detector circuits amenable to deployment in such a reverse signaling environment are known as represented by the aforementioned Richeson and Roach application.

SUMMARY OF THE INVENTION

The present invention overcomes the rather substantial prior art defect of unidirectional facsimile transmission by providing an improved receiver which transmits a confirmatory signal so long as the system is operating properly and an improved transmitter which continues transmission so long as it is receiving the confirmatory signal but ceases to transmit in the even that the confirmatory signal is no longer present.

Accordingly, it is one object of the present invention to provide an improved facsimile transmission system.

It is another object of the present invention to provide a facsimile system having bidirectional communication capabilities.

It is yet another object of the present invention to provide a facsimile system wherein the receiver supplies a confirmation signal to the transmitter.

It is a further object of the present invention to provide a facsimile system wherein the receiver supplies a first signal to the transmitter indicative of the fact that the receiver is ready to receive information and subsequently supplies a second signal to the transmitter indicative of the fact that facsimile reception is progressing normally.

The present invention contemplates the utilization of first and second carrier detector circuits in both transmitter and receiver and further contemplates the transmission of a first signal to effect the lock-out of any echo suppressor circuits which may be present in the telephone line and the transmission of a second signal both for the purposes of confirming the receipt of facsimile information and for the purpose of maintaining the echo suppressor circuits in the locked-out condition.

Accordingly, it is a further object of the present invention to provide a facsimile system which is uneffected by momentary line drop-outs, which acts to reestablish two way communication if a line drop-out should occur for a moderate length of time, and which acts to deenergize the transmitter and notify the transmitter operator in the event of an extended line drop-out.

These and other objects and advantages of the present invention may be better understood from the following detailed discussion given in conjunction with the accompanying drawing in which:

DESCRIPTION OF THE PREFERRED EMBODIMENT

Figure 1:
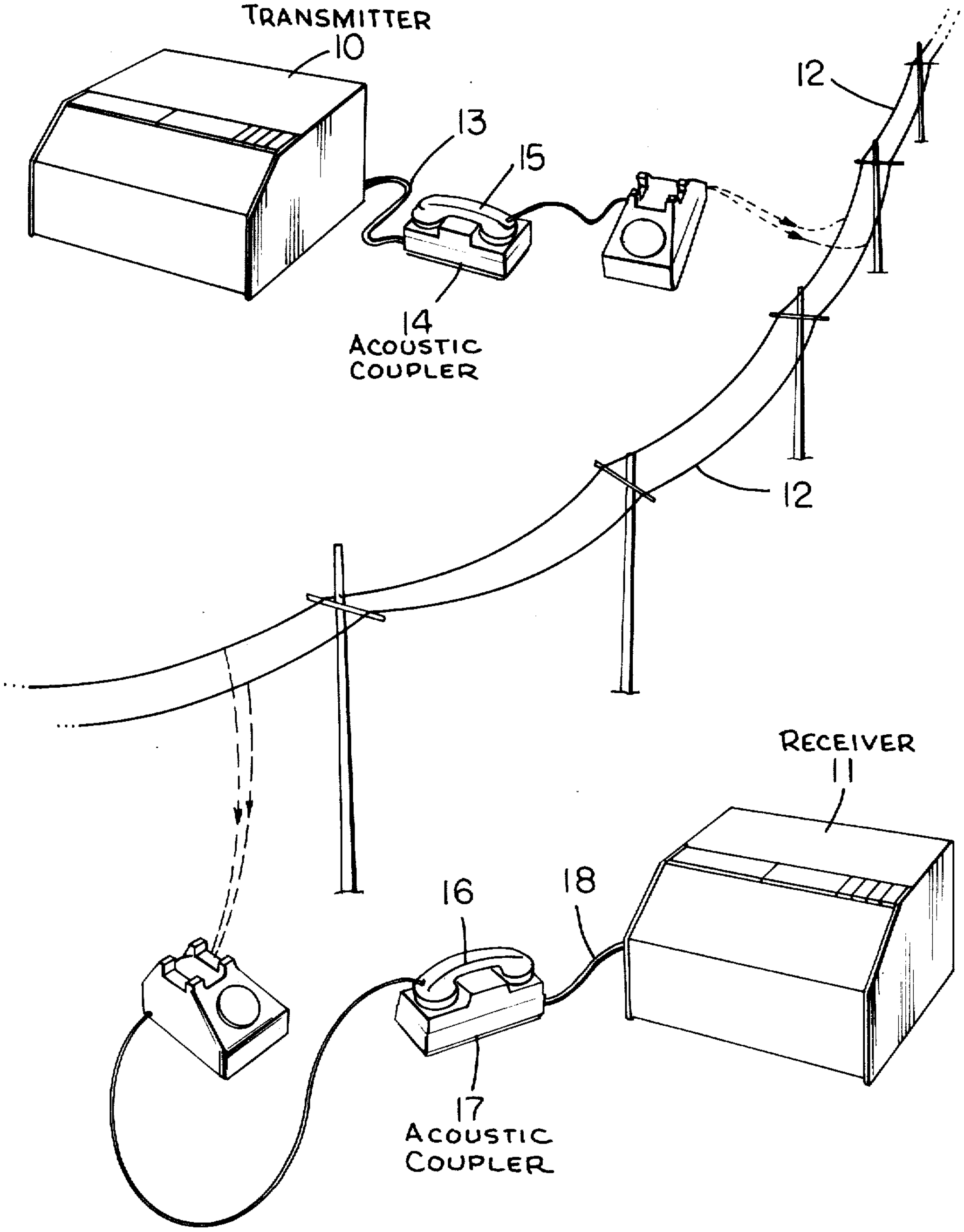
FIG. 1 illustrates a facsimile transmission system in which the present invention finds particular utility.

Turning now to FIG. 1, a facsimile system having two facsimile machines 10 and 11 connected over a telephone system or communication link 12 is shown. In FIG. 1 an acoustic coupling to the telephone line is used, however, inductive coupling or direct coupling could also be used. Preferably, both facsimile machines 10 and 11 are capable of functioning either as a transmitter or a receiver. In FIG. 1 it has been assumed that the facsimile machine 10 is used as a transmitter for scanning a document which is to be reproduced by the facsimile machine 11 so that the facsimile machine 11 is used as a receiver. The facsimile machines 10 and 11 are known in the art and may be of the type shown in the aforementioned applications and hence they will be only briefly described.

When used as a transmitter, the facsimile machine 10 scans a document, for example, with a moving spot of light and uses a light sensitive device for producing electrical signals indicative of the specific area on the document being scanned. These electrical signals may take various forms although the present invention contemplates video like signals, that is, signals derived from and representative of an image. The transmitter 10 converts the electrical signals into frequency modulated signals having an audio frequency indicative of the relative lightness or darkness of the specific area of the document being scanned. These frequency modulated signals are connected by a cable 13 to an acoustic coupler 14 having a loud speaker or similar acoustic transducer 50 which converts the electrical signals into audible signals. The audible signals are directed toward the mouthpiece or transmitter 51 of an ordinary telephone handset 15 which in turn is connected through the remainder of the telephone to the telephone system 12. By previously placing a local or long distance call, the operator of the transmitter 10 has established a connection with a telephone handset 16 at the location of the receiver 11.

While the telephone system 12 has been shown as comprising a simple open wire, it is to be understood that the system 12 may utilize any conventional communication facilities such as cable, cable carrier or radio carrier. The telephone at the receiver 11 has its handset 16 connected by an acoustic coupler 17 and a cable 18 to the receiver 11. When the acoustic coupler 17 is used in the receiving mode, the audible signals produced by the earpiece or receiver 52 of the telephone handset 16 are directed toward a microphone or receive transducer 53 in the acoustic coupler 17. The receive transducer in the acoustic coupler 17 converts these audible signals into electrical signals which are carried by a cable 18 to the receiver 11. The facsimile receiver 11 has appropriate electrical circuits for converting the electrical signals into mechanical functions which mark or produce marks on a blank copy paper or the like thus producing a facsimile copy of the original document. If the receiver 11 is properly synchronized with the transmitter 10, the document produced by the receiver is a fairly faithful and complete reproduction of the document scanned by the transmitter.

Figure 2:
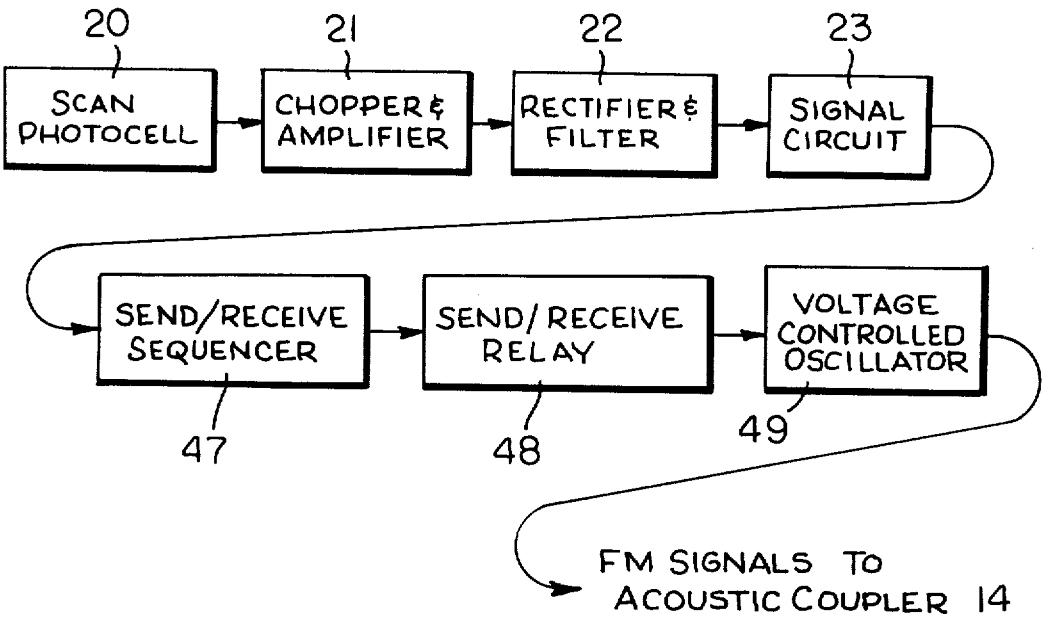
FIG. 2 is a block diagram of the transmitter of FIG. 1.

Turning next to FIG. 2 which shows an overall block diagram of the electrical circuit used to scan a document and produce frequency modulated signals indicative of the document scanned, the input to the electrical circuit is seen to consist of a scanning light sensitive transducer or photocell 20 whose signals are typically modulated direct current. These signals are chopped or broken up for simplified amplification and amplified in the chopper and amplifier 21. The amplified video signals are then rectified and filtered to produce direct current signals which may vary between selected levels, for example, between zero and 7 volts. In this particular example of a selected range, zero volts represents white on the original document and voltages above zero volts represent darker shades up to 7 volts which is representative of black on the original document. This rectification and filtering takes place in rectifier and filter circuit 22 and the out put of which is then coupled to a signal circuit 23. This signal circuit 23 modifies the direct current signals to make them have a different, that is, nonlinear, response for shades from white to black and has a switch for altering the circuit 23 to transmit either printed or photographic material using a more desirable transformation for these types of signals. Reference should be made to the aforementioned Richeson and Dreisbach application for a more detailed discussion of these transformations. Signals from the signal circuit 23 still fall within the direct current range of zero to 7 volts and are applied through the send-receive sequencer 47 and the send-receive relay 48 to a voltage controlled oscillator 49. The voltage controlled oscillator 49 utilizes the direct current signals to produce frequency modulated signals which vary, for example, between 1,500 and 2,450 cycles per second depending upon the direct current control voltage applied. These frequency modulated signals are applied to the acoustic coupler 14 of FIG. 1 which transforms them into audible signals for application to the telephone handset 15 and subsequent transmission to the receiver 11.

Figure 3:
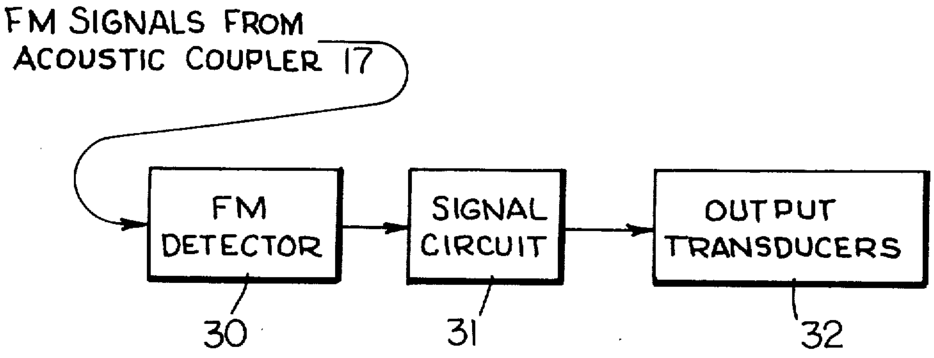
FIG. 3 is a block diagram of the receiver of FIG. 1.

FIG. 3 shows a block diagram representing the electrical circuit used in the receiver 11 for receiving the frequency modulated signals. These signals are produced as audible signals by the telephone handset 16 and applied to the acoustic coupler 17 which transforms the audible signals into electrical signals representative of the frequency modulated signals between 1,500 and 2,450 cycles per second. These signals are applied to a frequency modulation detector 30 which transforms the signals into direct current signals ranging between zero and 7 volts and varying in this range at rates up to 1,260 cycles per second. This last figure corresponds approximately to alternating black and white increments on the original document corresponding to a resolution of 96 lines per inch. These direct current signals are applied to a signal circuit 31 which further modifies the signals to make the response for the overall system more linear when signals representing a picture are being transmitted. Again, reference should be made to the aforementioned Richeson and Dreisbach application for a more detailed discussion of this signal circuit. The same circuit 31 when fed from a transmitter that is in the print mode creates an overall system response which is a high contrast for print type of copy. The direct current signals from the circuit 31 have sufficient power to drive the output transducers 32 which transform the electrical signals into appropriate mechanical or physical motion that marks or causes a mark to be produced on the blank copy. This mark may be made by a pen and ink or as in the preferred embodiment by pressing against a piece of carbon paper held against a paper that becomes the copy of the original document. This pressure causes the carbon paper to leave a mark which represents part of the picture being scanned at the transmitter 10.

Figure 4:
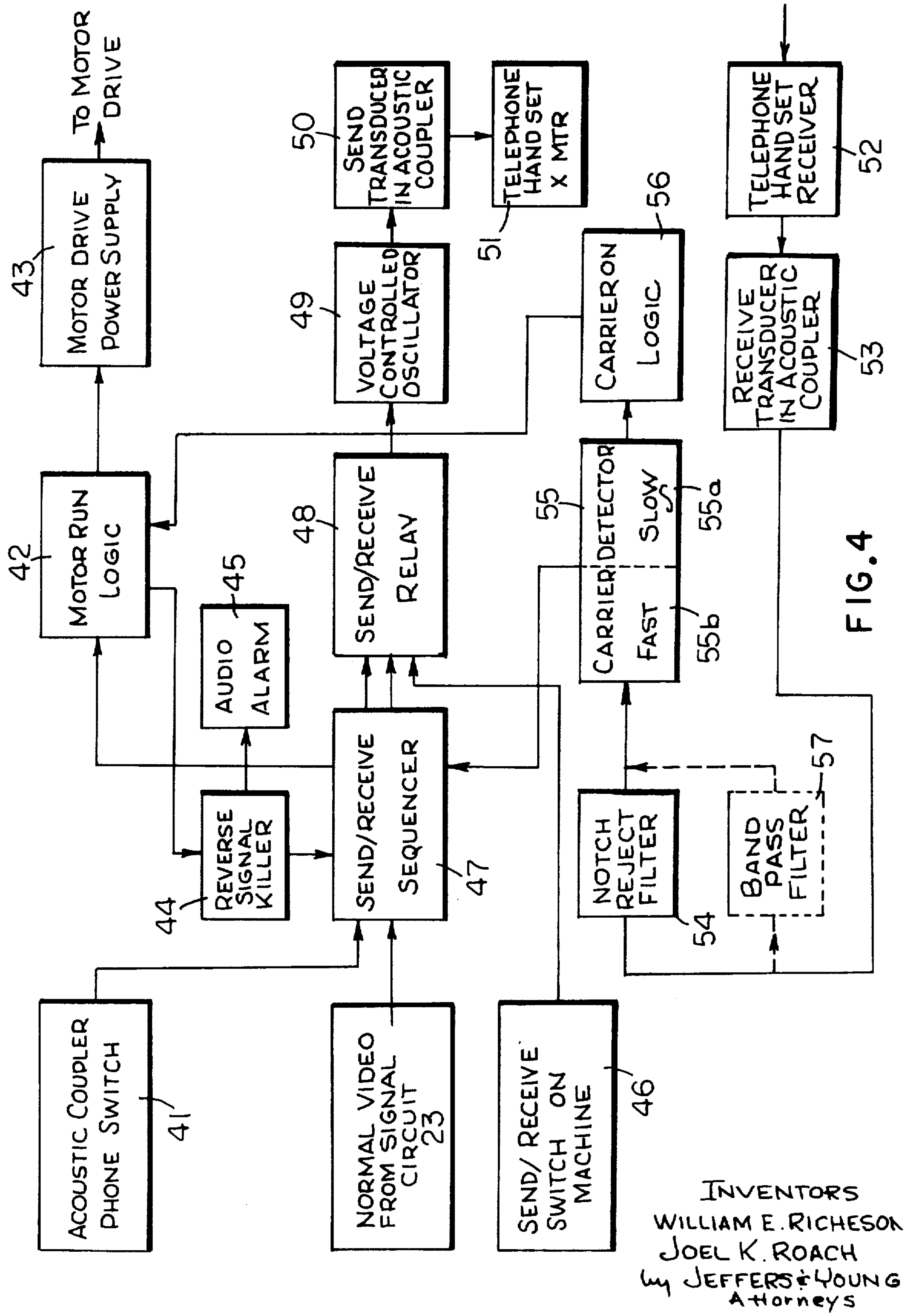
FIG. 4 is a block diagram of the reverse signaling circuit of the present invention.

FIG. 4 shows a block diagram of the reverse signaling circuit which basically comprises a send-receive sequencer 47 which is a monostable multivibrator with a time constant of 2 seconds, a reverse signal killer 44, a logic circuit and audio alarm 45, a 2,850 cycle per second notch reject filter or narrow band reject filter 54, a 2,850 cycle per second bandpass filter 57 which is a narrow bandpass filter, and a fast-slow carrier detector circuit 55. The remainder of the blocks in FIG. 4 represent prior art circuitry present in the facsimile system as represented by the aforementioned applications and will only be discussed as they arise in conjunction with the functional discussion of the system.

Figure 5:
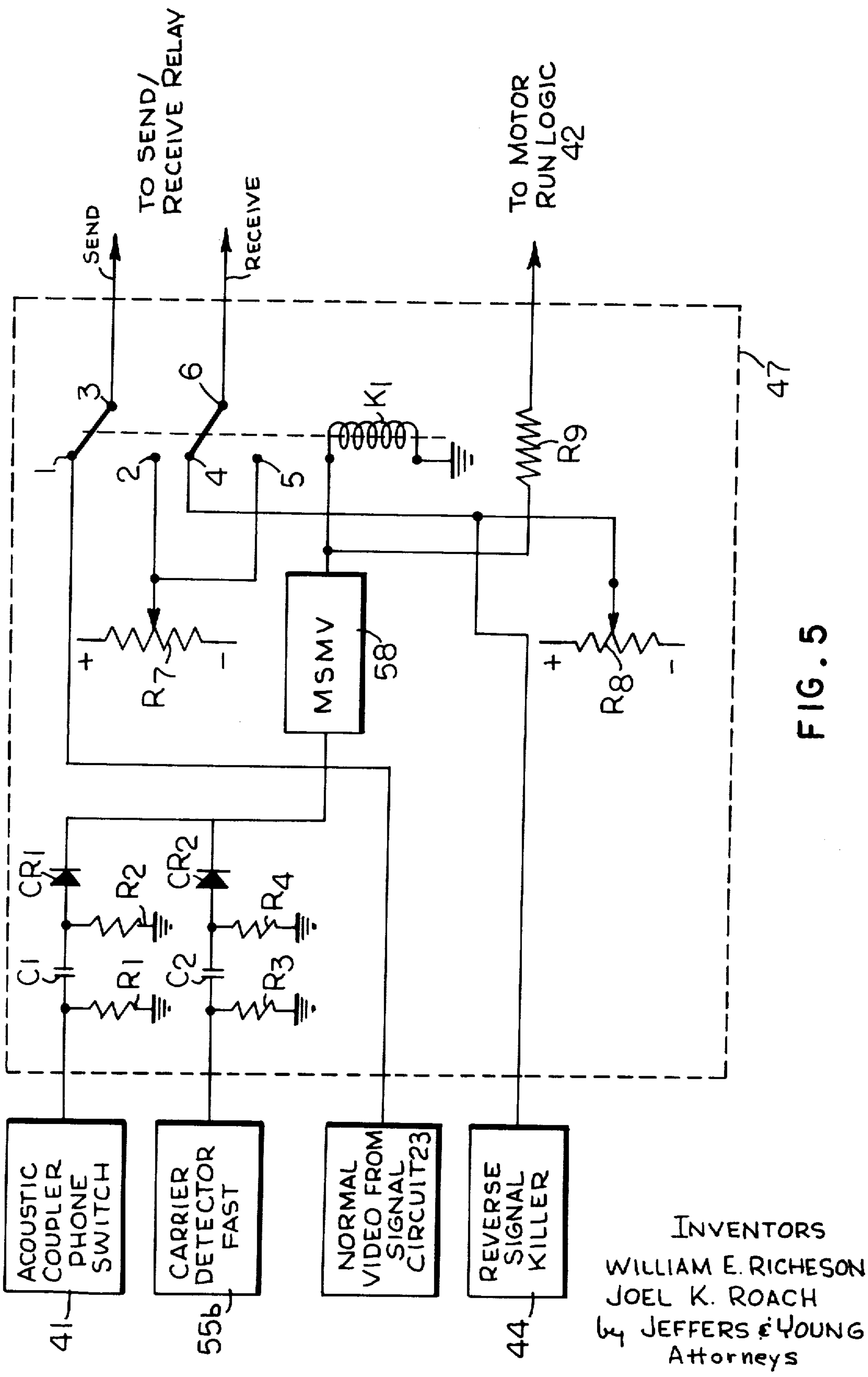
FIG. 5 is a block diagram of the send receive sequencer of FIG. 2.

The nature, function, and operation of the present inventive contribution can be understood most clearly from a detailed step wise discussion of the facsimile transmission process. The transmitter operator places the document to be transmitted into the platen of the transmitter 10. The operator then sets the send-receive switch 46 on the transmitter to the send position, thus energizing the transmitter and applying a ground reference through the switch 46 to the send-receive relay 48 energizing the relay. The send-receive relay 48 when energized makes the necessary internal connections required to put the facsimile machine 10 into the transmit mode of operation. One set of contacts of the relay 48 connect the normal video channel 23 to the voltage controlled oscillator 49. The transmitter operator now places a telephone call to the telephone at the receiver location and informs the receiver operator that data is going to be sent. The receiver operator places copy set or other pressure sensitive copying medium e.g., bond paper and carbon paper into the platen of the facsimile machine 11. The receiver operator sets the send-receive switch 46 on the facsimile machine 11 to the receive position, thus energizing the receiver. The output of the send-receive sequencer 47 is connected through the send-receive relay 48 which is in its deenergized position when in the receive mode of operation to the input of the voltage controlled oscillator. The receiver operator next places the telephone handset 16 into the acoustic coupler 17, mating the telephone handset transmitter 51 and receiver 52 respectively with the send transducer 50 and receive transducer 53 of the acoustic coupler. The receive operator then engages the acoustic coupler phone switch 41 to cause a step voltage from −18 volts to +18 volts to be applied to the send-receive sequencer 47. This step voltage represents the logic condition of changing from no phone in the acoustic coupler 17 to a phone in the acoustic coupler 17. The step voltage is differentiated across R1, C1, and R2 of FIG. 5 and the thus differentiated wave form is applied to monostable multivibrator 58 by way of the diode CR1 causing the monostable multivibrator 58 to be activated which in turn energizes the coil of relay K1 causing contacts 3 and 6 to make an electrical connection with contacts 2 and 5 respectively. Contact 6 in the case of the receiving station and contact 3 in case of the transmitting station is connected through the send-receive relay 48 to the input of the voltage controlled oscillator 49. No connection is made to contact 3 of this relay during the receive mode of operation. A voltage of +3.9 volts direct current is supplied from voltage divider R7 to contact 5, through contact 6 and in turn to the voltage controlled oscillator 49 causing the oscillator to generate a frequency of 2,050 cycles per second and this signal is applied to the send transducer 50 in the acoustic coupler 17 through connecting cable 18. This signal which is generated when the unit is in the receive mode is acoustically coupled to the telephone transmitter 51 of the telephone handset 16 and is thus applied to the telephone line 12. The 2,050 cycle per second signal will last for a 2 second interval as determined by the time constant of monostable multivibrator 58. This 2 second 2,050 cycle per second signal locks out the telephone line echo suppressor (if one is present) and allows for simultaneous two way communication over the telephone line 12 and also serves as a ready signal to notify the transmitter operator that the receiving station is ready to receive.

An echo suppressor is a device in a standard long distance telephone line which causes the line to be unidirectional, so long as a given party is talking. Such an echo suppressor in its simplest form would be a relay which in one position would connect an amplifier or repeater in the telephone line in a given direction of transmission while in its other position it would connect the same amplifier in the reverse direction of transmission. This relay would be responsive to a signal introduced at one end of the telephone transmission line to cause that line to be unidirectional so as to transmit the signal to which it was responsive and so long as a signal continued to flow in that direction, the relay would not reverse the direction of transmission. These echo suppressors as presently used in telephone lines remain energized for a given direction of transmission for a period of 48 milliseconds after the transmission ceases and then the line returns to a signalless state which allows transmission in either direction. These echo suppressors as presently used also may be circumvented by the application of a 2,050 cycle per second signal which in effect bypasses the echo suppressor and allows two way communication so long as an information signal is passing in one direction and the information signal does not drop out for a period in excess of 48 milliseconds.

If the transmitter or receiver run logic is not ready for a run condition, transmission of an acoustic signal is prevented due to the built in logic controlling the output of the voltage controlled oscillator. At the end of the two second interval, the monostable multivibrator 58 reverts to its quiescent state and contact 6 makes an electrical connection with contact 4 of the relay K1 and a 9.6 volt DC signal from the voltage divider R8 is now supplied through the send-receive relay 48 to the voltage controlled oscillator 49. This 9.6 volt signal will cause the voltage controlled oscillator 49 to oscillate at a frequency of 2,850 cycles per second and this signal is applied to the send transducer 50 through cable 18 and hence acoustically coupled to telephone handset transmitter 51. The 2,850 cycle per second signal is blocked from the carrier detector circuit 55 in the receiver 11 by a high Q 2850 cycle per second notch reject filter 54. This filter is used only in the receive mode of operation and is actuated by the send-receive switch 46 so that the receiver 11 will not be effected by its own signal. The telephone transmitter 51 of the telephone handset 16 applies this signal to the telephone line 12.

When the 2,050 cycle per second signal from the receiver 11 is applied to the telephone line 12, the transmitter operator will hear this tone in the telephone handset receiver 52 of telephone handset 15 and will interpret this tone to mean that the receiver and the receiver operator are ready to receive the transmitted message. The transmitter operator will then place telephone handset 15 into the transmitter acoustic coupler 14 thereby mating the telephone handset transmitter 51 and receiver 52 respectively with the send transducer 50 and receive transducer 53 of the acoustic coupler 14. The transmitter operator then actuates the acoustic coupler phone switch 41 in the coupler 14 causing a step voltage from −18 volts DC which is a no phone logic condition to +18 volts DC to be applied to the send-receive sequencer 47. The step voltage is differentiated across R1, C1, and R2 of FIG. 5 and the thus differentiated wave form is applied to monostable multivibrator 58 by way of diode CR1. Monostable multivibrator 58 is activated energizing the coil of relay K1 and causing contacts 3 and 6 to make electrical connection with contacts 2 and 5 respectively. Contact 3 of relay K1 is connected through the send-receive relay 48 to the input of the voltage controlled oscillator 49. No connection is made to contact 6 of the relay K1 during the send mode of operation. A voltage of +3.9 volts direct current is supplied from the voltage divider R7 to contact number 2 of the relay K1 and in turn to the voltage controlled oscillator by way of contact 3. This 3.9 volt direct current signal applied to the voltage controlled oscillator 49 causes the oscillator to generate a frequency of 2,050 cycles per second and this signal is in turn applied to the send transducer 50 by way of connecting cable 13. This signal is acoustically coupled into the telephone handset transmitter 51, through the send telephone 15, to the telephone line 12. The 2,050 cycle per second will last, for example, for 2 seconds as determined by the time constant of the monostable multivibrator 58. This 2 second signal locks out any telephone line echo suppressors that may be present and allows for simultaneous two way communication over the telephone line. In the transmitter, the 2,850 cycle per second high Q bandpass filter 57 is switched in in place of the corresponding notch reject filter 54, thus allowing the receive portion of the transmitting machine 10 to receive only signals of a 2,850 cycle per second frequency.

When the monostable multivibrator 58 in the receiver unit 11 times out or returns to its quiescent state, the receive unit then transmits a 2,850 cycle per second reverse signal to the transmitting unit. The telephone handset receiver 52 in the transmitter unit will pick up the 2,850 cycle per second signal and apply it to the receive transducer 53 in the transmitter acoustic coupler 14 and this signal in turn will pass through the 2,850 cycle per second bandpass filter 57 and be applied to the carrier detector circuit 55 which maintains the transmitter run logic 56 and 42 in a run state. When the transmitter operator places the transmitter telephone handset 15 into the acoustic coupler 14, the monostable multivibrator 58 in the transmitter actuates for 2 seconds. During this period of time, the 2,850 cycle per second reverse signal from the receiver 11 will be received at the transmitter 10 and will actuate the carrier detector circuit 55 in the transmitter. The pulse from the fast side of the carrier detector circuit 55 applied to the monostable multivibrator 58 will have no effect on the monostable multivibrator 58 while it is timing out. The slow side of the transmitter carrier detector circuit 55 will actuate the transmitter carrier on logic 56 which in turn serves to actuate the transmitter motor run logic 42 and this in turn actuates the transmitter motor drive power supply 43 thus resulting in actuation of the transmitter unit 10 into its normal mode of operation.

The carrier detector circuit 55 is divided into two parts, a fast side and a slow side. The characteristics of this circuit are such that both halves will detect the presence of a carrier and actuate in 800 milliseconds. If the carrier drops out for a period greater than 48 milliseconds the fast side of the circuit will change state, however, the carrier must drop out for a period greater than two seconds before the slow side will actuate. The operation of the carrier detector circuit 55 is identical in both the transmit and receive modes and a specific circuit capable of being utilized as the carrier detector circuit is disclosed in the above mentioned Richeson and Roach application. When the transmitter 10 assumes its normal mode of operation, the monostable multivibrator 58 will time out and release relay K1 in the send-receive sequencer 47. When relay K1 releases, contact 3 will make with contact 1 and apply the normal video signal from the signal circuit 23 through the send-receive relay 48 to the voltage controlled oscillator 49. The receiver will actuate on the received signals and go into its normal receive mode of operation. The carrier on logic 56 in conjunction with the motor run logic 42 will keep the receiver running so long as the receiver continues to receive an input signal. So long as the receiver unit continues to run, it will continue to transmit a 2,850 cycle per second reverse or confirmatory signal to the transmitter unit 10 and so long as the transmitter unit 10 receives this 2,850 cycle per second confirmatory signal from the receiver, the carrier on logic 56 and the motor run logic 42 in the transmitter will maintain the transmitter in operation.

If there is a line drop out of less than 48 milliseconds duration, the slow carrier detector circuit **55*a* in both the transmitter and receiver will keep the system in operation although no data will be received during this time interval. The echo suppressor on the telephone line 12, if present, should remain locked out since it has a time constant of about 50 milliseconds. Assume now that there is a line drop out for a period greater than 50 milliseconds but less than 2 seconds. In this event the echo suppressor, if present, will re-engage and it will be necessary to regenerate the 2,050 cycle per second lock out tone. The fast carrier detector circuit 55*b* has a time delay of 48 milliseconds so that for any drop out of a lesser duration nothing happens. When the line drop out exceeds 48 milliseconds, the fast carrier detector circuit 55*b* in both the transmitter and receiver will change states and apply a pulse across resistor R3 in the send receive sequencer. This pulse will be differentiated by capacitor C2 and resistor R4 and applied to monostable multivibrator 58 through the diode CR2. The monostable multivibrator will change state and cause relay K1 to actuate for 2 seconds. During this two second interval, a 2,050 cycle per second tone will be applied to the telephone line as was previously described. During this period of time, the output of the monostable multivibrator 58 is also fed through resistor R9 to the motor run logic 42 in both the transmitter and receiver units. This signal applied to the motor run logic 42** will maintain both machines in operation during this interval. At the end of the two second interval, the monostable multivibrator will assume its quiescent state, relay K1 will be deenergized, normal operation will be restored, and the echo suppressor will again be locked out. During the interval of time when the 2,050 cycle per second lock out tone is present, a gray strip of approximately 0.063 inches in width will appear on the received copy and since, for example, a type written document is largely blank paper, the chances are good that this gray area will no way impair the quality of the copy.

If there is an interruption or line drop out for a period of time in excess of 2 seconds, the slow carrier detector circuits 55*a* of both the transmitter and the receiver will switch states. The receiver 11 slow carrier detector circuit will stop receiving the send data and the receiver carrier on logic 56 and the motor run logic 42 will change states. The receiver motor drive power supply 43 will be turned off, hence the receiver will cease running. The change in state of the receiver motor run logic 42 is applied to the receiver reverse signal killer 44 logic circuit. The output of the reverse signal killer applies ground potential to relay K1 pin number 4 in the receiver send receive sequencer 42 and causes the receiver 11 to cease transmitting the 2,850 cycle per second tone to the transmitter. The reverse signal killer 44 in the receiver will also actuate the receiver audio alarm circuit 45 which produces an audible alarm which in turn will notify the operator that communications have been lost. When for any reason the receiver 11 ceases to transmit the 2,850 cycle per second signal to the transmitter 10, the transmitter will continue to operate for a 2 second interval due to the delay in the transmitter slow carrier detector circuit 55*a*. At the end of this 2 second interval, the transmitter carrier on logic 56 will deactivate causing the motor run logic 42 to also deactivate which in turn turns off the motor drive power supply 43 thus deenergizing the transmitter. When the transmitter motor run logic 42 changes state, it will activate the reverse signal killer 44 in the transmitter which in turn activates the transmitter audio alarm 45. This audio alarm will produce an audible signal telling the transmitter operator that communications have been lost. At this point, transmitter and receiver operators may get in voice contact with each other to determine the nature of the trouble. In a similar fashion, if at any time during the transmission the receiver operator wishes to get in contact with the transmitter operator, he need only lift the receiver phone from the acoustic coupler 17 which will deactivate the 2,850 cycle per second signal shutting down the system in the manner just described.

In summary then, when relay K1 is in its deenergized position, contact 6 makes with contact 4 and applies 9.6 volts DC through the send-receive relay 48 to the voltage controlled oscillator. The voltage controlled oscillator produces a 2,850 cycle per second tone which is sent to the transmitting unit and is the reverse or confirmatory signal from the receiver. If there is a line drop out for more than two seconds, the slow carrier detector 55a switches state and through the carrier on logic 56 causes the motor run logic 42 to also switch state and turn off the main drive power supply 43. At this point, the receiver would continue to transmit the 2,850 cycle per second reverse confirmatory signal even though it has been shut down unless a means is provided to "kill" the 9.6 volt direct current signal at pin number 4 of relay K1. The reverse signal killer 44 is a logic unit which is controlled by the motor run logic circuitry 42 and is responsive to a change in state representing a turn off condition to apply a ground to contact 4 of relay K1 and thus cause the cessation of transmission of the 2,850 cycle per second reverse or confirmatory signal from the receive unit.

Figure 6:
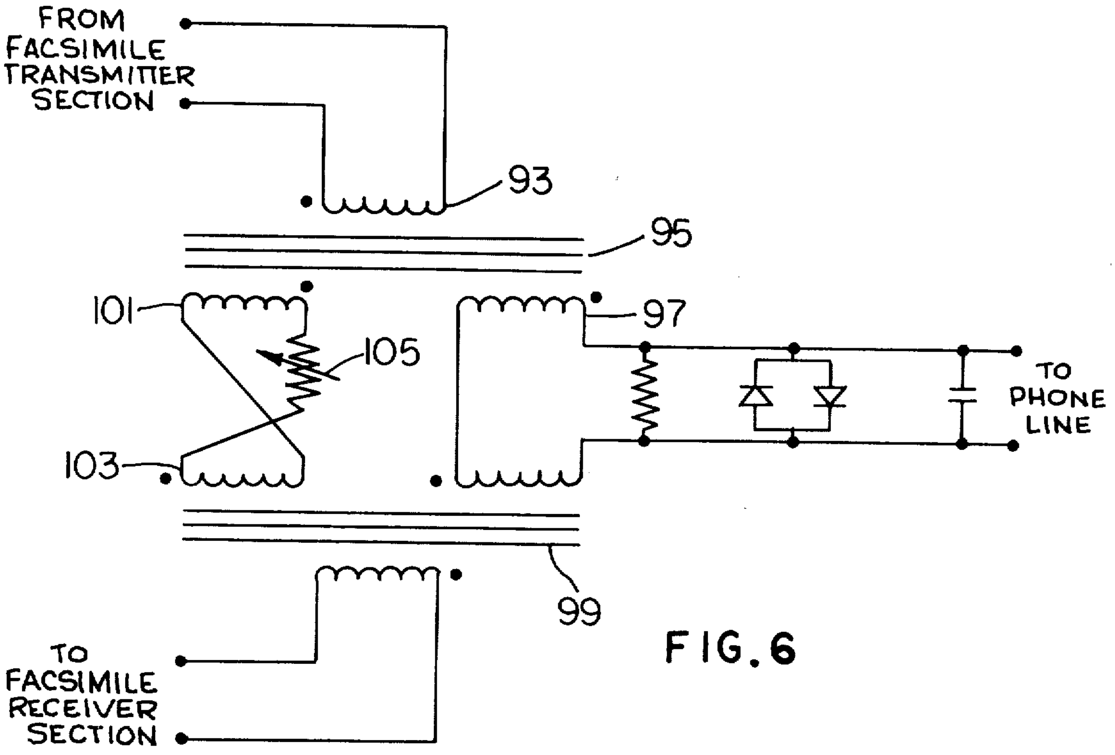
FIG. 6 illustrates a hybrid transformer which might be utilized in an alternative form of the present invention.
Figure 7:
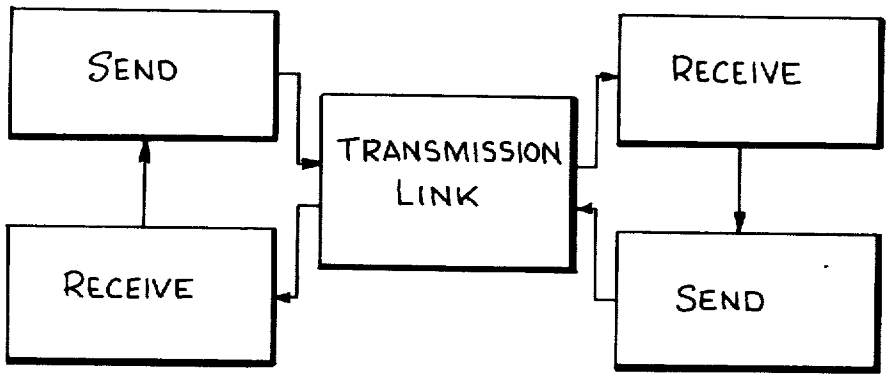
FIG. 7 shows a block diagram of the system utilizing hybrid transformer of FIG. 6.

The above method of reverse signaling may employ hybrid transformer coupling as illustrated in FIG. 6 so as to allow the confirmatory signals to be used at frequencies within the data spectrum yet maintain isolation so that a given unit is not troubled by the signal it is generating. To accomplish this hybrid transformer coupling the acoustic coupler 14, transmitter telephone 15, receiver telephone 16, and acoustic coupler 17 would be replaced by a transmitter and a receiver hybrid transformer coupler wherein the transmitted and received signals would be coupled directly from the transmitter 10 and receiver 11 to the telephone line 12. Such hybrid coupling has the advantage that it is possible with minimal wiring adaptations to send copy both ways over the transmission line simultaneously. As seen by FIG. 7 this scheme has the draw back that the confirmatory signals from each receive unit are directed to the send unit at the same location rather than through the transmission line.

FIG. 6 shows one possible hybrid transformer coupling arrangement for use at one facsimile location. Locally transmitted facsimile information is fed to the winding 93 on transformer 95. This induces a current in the secondary winding 97 which supplies the locally generated facsimile information to the telephone line and also induces the information into one of the windings of transformer 99. Winding 101 of transformer 95 is coupled to winding 103 of transformer 99 but in such a fashion that the flux induced in transformer 99 coming from winding 97 opposes that induced from winding 101 so that the net effect is to prevent the local receiver from detecting the locally generated facsimile information. On the other hand, incoming facsimile information is directly supplied to the local receiver section by the transformer 99. The operation of this circuit of course is dependent upon a certain symmetry of the two transformers 95 and 99 and if these two transformers are in fact not properly balanced, there will be some information fed from the local transmitter section to the local receiver section. A balancing resistor 105 may be used to balance the particular pair of transformers involved. The familiar dot notation for transformer polarity is also included in FIG. 6. Of course, another circuit similar to FIG. 6 is located at the remote location so that these two locations may both simultaneously transmit and receive facsimile information.

Figure 8:
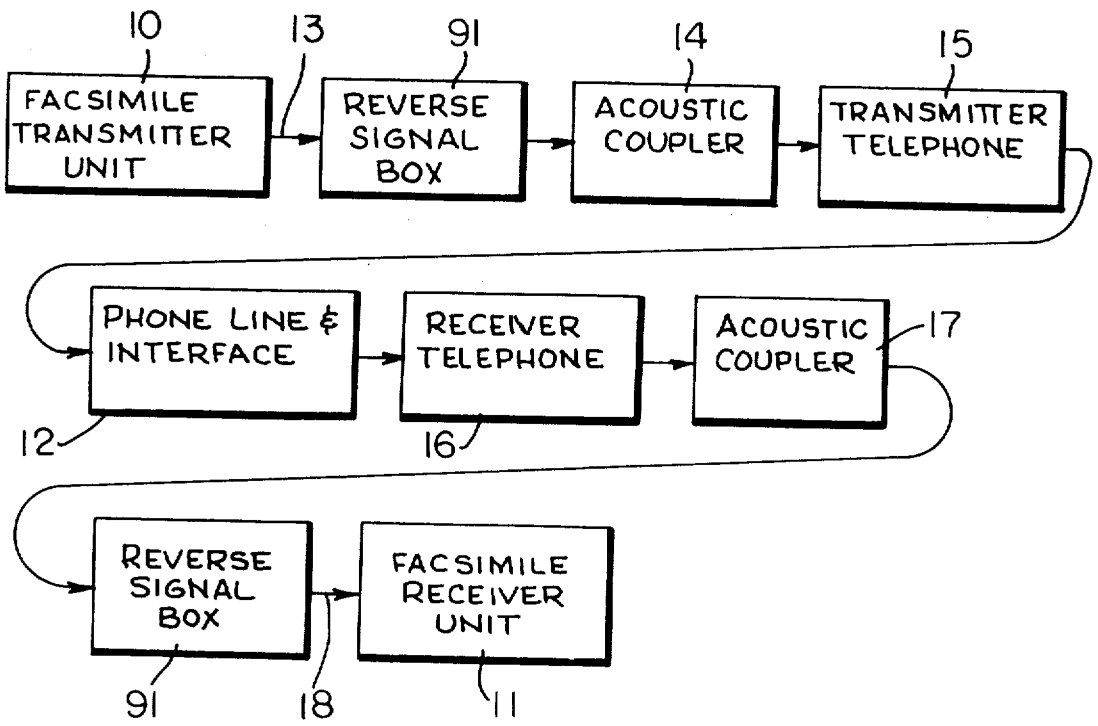
FIG. 8 is a block diagram of the transmission system utilizing a simplified reverse signaling.
Figure 9:
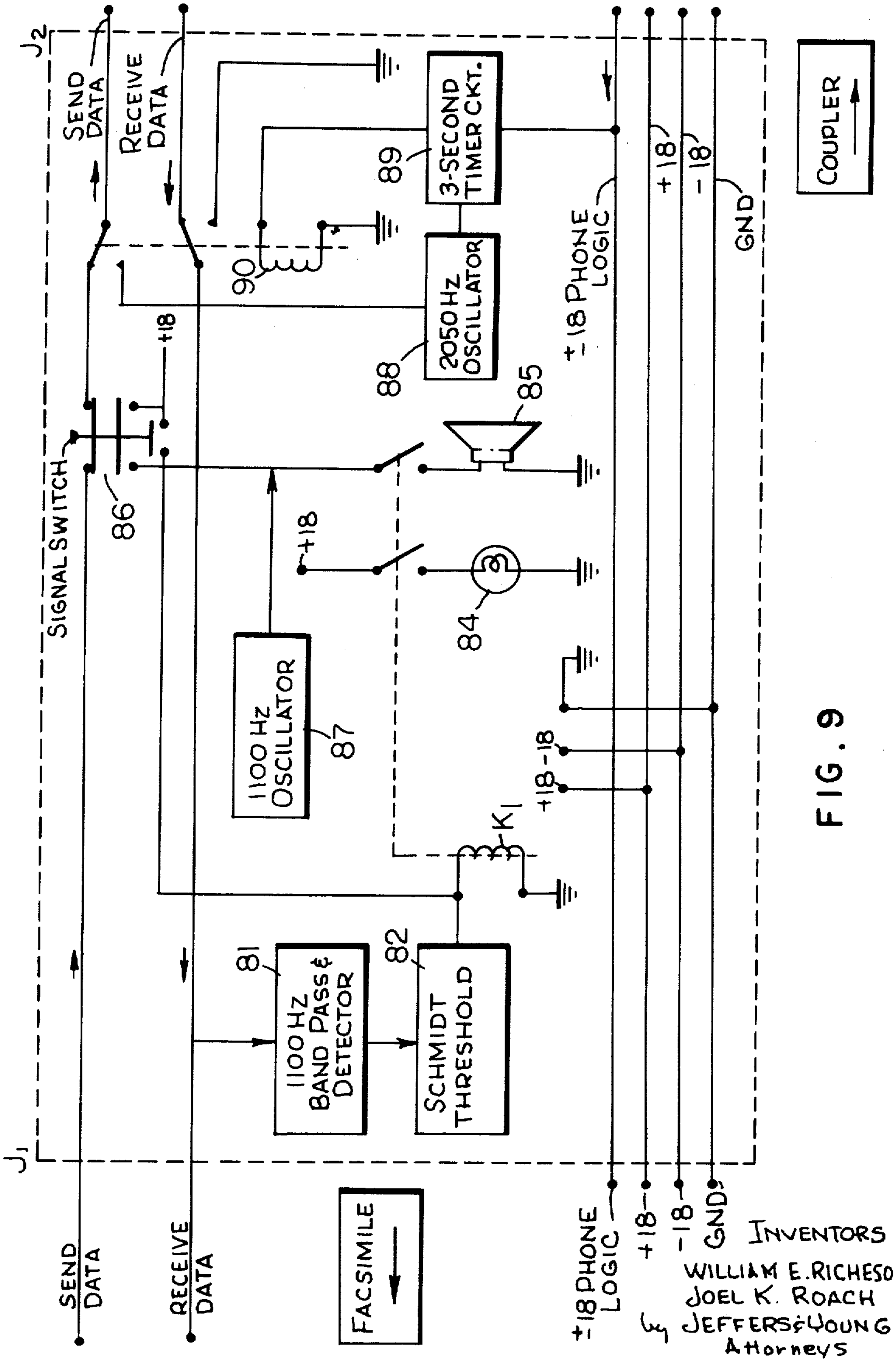
FIG. 9 is a circuit diagram of the reverse signaling box of FIG. 8.

A simplified form of reverse signaling which would be adaptable to existing machines with only very minor modifications is shown in FIGS. 8 and 9. This system would be contained in a small auxiliary box 91 that would be connected between existing acoustic couplers and existing facsimile machines. The details of the reverse signal box 91 shown in the block diagram of FIG. 8 are shown in FIG. 9. The telephone 16 associated with the receiving unit is placed in the coupler 17 and as before the −18 volt to +18 volt no phone to phone transistion is made. This transistion activates a 3 second 2,050 cycle per second tone generator 88 and 89 and also a receive tone data relay 90 to the tone position. The 2,050 cycle per second tone serves as before to lock out the echo suppressor on the telephone line and also serves as the receiver ready tone. To prevent acoustic feedback effects from causing a false start of the receiving machine, the input data line will have to be temporarily disconnected by the receive tone data relay 90. At the end of the three second interval, the receive tone data relay 90 switches back and allows normal operation.

At the transmitter end, the operator will hear the 2,050 cycle per second tone from the receiver and will place the send phone 15 in the acoustic coupler 14. The no phone to phone transistion signal will be used to switch a send tone data relay 90 to the tone position and a 2,050 cycle per second tone will be generated for three seconds by the oscillator 88 in conjunction with the timer circuit 89. As noted previously, this tone serves to lock out any echo suppressors which may be present in the communication path and will start both the transmitter and receiver motors turning and allow them to come up to speed. At the end of the 3 second period, the send tone data relay 90 will switch to the data output line.

The portions of the reverse signaling box which are common in operation in both the transmitter and receiver portions include an 1,100 cycle per second tone generator 87, an 1,100 cycle per second narrow bandpass filter 81, a Schmitt detector circuit with a high threshold 82, a reverse signal push button 86, an indicator lamp 84 and a small audio amplifier and loud speaker 85 with an internally controlled level adjustment. When either the send or receive operator wishes to reverse signal, he depresses the reverse signal button 86 which activates the 1,100 cycle per second generator 87 placing this signal on the line and also lighting the indicator lamp 84 and energizing the loud speaker 85. At the opposite end, the tone will be filtered out by the filter 81 detected and applied to the Schmitt trigger circuit 82. The Schmitt circuit will cause the indicator 84 to be lit and will also cause the received tone to be applied to the audible alarm circuitry 85 which comprises the audio amplifier and loud speaker combination. At this point, the send and receive operators will pick there respective telephones up and communicate with each other.

In summary then, the invention is seen to reside in the provision of improved facsimile transmitter and receiver units wherein the receiver unit reverse signals a first signal adapted to disable any echo suppressors which may be present in the telephone line so as to allow two way communication as well as to notify the transmitting unit that the receiver is ready to receive information and also providing from the receiver to the transmitter a second reverse signal which simultaneously maintains disabled the echo suppressors and which indicates to the first unit any failure in the transmission of information. The appropriate filters and carrier detector circuits are also included so that a short interval interruption in transmission will not disable the system but rather will reactivate the signal which disables the echo suppressors while a drop out for an extended period of time deenergizes the receiver and transmitter and allows the two operators to get into verbal contact and determine the cause of trouble.

Thus while the invention has been described with respect to a specific embodiment, numerous modifications will suggest themselves to persons of ordinary skill in the art and the scope of the invention is to be measured only by that of the appended claims.

We claim:

1. In a facsimile transmission system having a first unit adapted to scan an original document and send facsimile information representing the scanned document over a standard telephone line and a second unit adapted to receive the information sent and reproduce a copy of the original document, the improved method of effecting communication between said units comprising:

transmitting over said telephone line from the second unit to the first unit a first signal adapted to disable any echo suppressor which may be present in the telephone line so as to allow two way communication between said first and second units and to notify the first unit that the second unit is ready to receive facsimile information;

providing from the second unit to the first unit a second signal which provides the first unit with an indication of the continued receipt of facsimile information from the first unit, said first signal being provided for a first predetermined period of time and ceasing prior to the provision of said second signal;

filtering subsequent to the lapse of said first predetermined period of time the input to the first unit so as to pass only said second signals;

and filtering subsequent to the lapse of said first predetermined period of time the input to the second unit so as to reject said second signal.

2. An improved facsimile system comprising:

a transmitter adapted to simultaneously send video information and receive a confirmatory signal;

a receiver adapted to simultaneously receive said video information and transmit said confirmatory signal;

a narrow band pass filter in said transmitter adapted to pass said confirmatory signal;

and a narrow band reject filter in said receiver adapted to reject said confirmatory signal.

3. The facsimile system of claim 2 wherein transmission of said confirmatory signal is begun a predetermined time after said receiver is ready to receive information.

4. The facsimile system of claim 2 wherein the transmitter and receiver are coupled together by way of an ordinary telephone line further comprising:

means for generating a lock-out signal effective to disable any echo suppressor present in the telephone line.

5. The facsimile system of claim 3 wherein the transmitter and receiver are coupled together by way of an ordinary telephone line further comprising:

means for generating a lock-out signal prior to transmission of said confirmatory signal, which lock-out signal is effective to disable any echo suppressor present in said telephone line.

6. The facsimile system of claim 4 further comprising:

a first carrier detector circuit associated with at least one of said transmitter and receiver and responsive to the cessation of said confirmatory signal for at least a first time interval to regenerate said lock-out signal.

7. The facsimile system of claim 6 further comprising a second carrier detector circuit associated with at least one of said transmitter and receiver and responsive to the cessation of said confirmatory signal for at least a second time interval greater than said first time interval to disable said receiver and to supply an indication to said transmitter.

8. An improved facsimile system comprising:

a facsimile transmitter adapted to simultaneously send frequency modulated video signals lying within a predetermined frequency range, and receive a confirmatory signal having a frequency outside said predetermined frequency range;

a receiver adapted to simultaneously receive said frequency modulated video signal, and transmit said confirmatory signal;

and, means for initiating the transmission of said confirmatory signal a predetermined time after said receiver is ready to receive facsimile information.

* * * * *